(12) United States Patent
Kaver et al.

(10) Patent No.: US 12,323,203 B2
(45) Date of Patent: Jun. 3, 2025

(54) DEFECTIVE TRANSMIT CHAIN MITIGATION

(71) Applicant: Parallel Wireless, Inc., Nashua, NH (US)

(72) Inventors: Yaniv Kaver, Kefar Seva (IL); Shay Karuchi, Ramat Gan (IL); Efi Dror, Kadima-Zoran (IL); Steven Paul Papa, Windham, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 18/298,369

(22) Filed: Apr. 10, 2023

(65) Prior Publication Data

US 2023/0327719 A1  Oct. 12, 2023

Related U.S. Application Data

(60) Provisional application No. 63/328,781, filed on Apr. 8, 2022.

(51) Int. Cl.
*H04B 7/0456* (2017.01)
(52) U.S. Cl.
CPC ................. *H04B 7/0456* (2013.01)

(58) Field of Classification Search
CPC .... H04B 7/0456; H04B 17/17; H04B 7/0482; H04B 7/046; H04B 7/0465; H04B 17/18; H04B 17/16
See application file for complete search history.

(56) References Cited

U.S. PATENT DOCUMENTS

| | | | |
|---|---|---|---|
| 2011/0312353 A1* | 12/2011 | Banister | H04W 52/028 455/500 |
| 2019/0334640 A1* | 10/2019 | Belfiore | H04B 1/40 |
| 2020/0037328 A1* | 1/2020 | Sridharan | H04W 52/246 |
| 2023/0299875 A1 | 9/2023 | Dror et al. | |

* cited by examiner

*Primary Examiner* — Khanh C Tran
(74) *Attorney, Agent, or Firm* — Michael Y. Saji

(57) ABSTRACT

In the case that several transmitting elements (e.g., a Tx chain) are simultaneously impaired, at least two different layouts are possible: the defected Tx chains are randomly scattered around the array; or, the defected Tx chains are aligned vertically on a random column (for 12 and 24 defected Tx chains—1 and 2 such columns are randomly chosen, respectively). It can be seen that the throughput is worse when the defected Tx chains are aligned in a column rather than randomly scattered, unless the defective Tx chains are known, in which case it is the opposite. This is because disabling an entire column has the most significant effect on the spatial null steering. When defected Tx chains are known the performance of all layouts are almost the same, though column yields slightly better results due to the antenna subarrays (2 vertical antennas have the same feed, therefore we lose less degrees of freedom).

20 Claims, 17 Drawing Sheets

ANTENNA ARRAY 3D

CHANNEL EXAMPLE -
BS, UES AND REFLECTORS LOCATIONS

CHANNEL EXAMPLE -
CHANNEL COEFFICIENTS

AVERAGE THROUGHPUT, KNOWN DEFECTED TX CHAINS, PER ANTENNA POWER CONSTRAINT.

THROUGHPUT PER CHANNEL WITH DIFFERENT WINDOWING

DELAY SPREAD

DEFECTIVE TRANSMIT CHAIN MITIGATION

CROSS-REFERENCE TO RELATED APPLICATIONS

The present application claims the benefit of priority under 35 U.S.C. § 119(e) to U.S. Provisional Patent App. No. 63/328,781, having the same title as the present application, and hereby incorporated by reference in its entirety for all purposes. The present application hereby incorporates by reference U.S. Pat. App. Pub. Nos. US20110044285, US20140241316; U.S. Provisional Pat. App. No. 63/477, 142; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "Max-Mesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850U501); US20170272330A1 (PWS-71850U502); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

Manufacturing antenna arrays for Massive Input Massive Output (MIMO) has a tradeoff between maximum power transmitted from each antenna element and the element reliability. Enabling higher power transmission from an element increases the malfunction rate of that element.

In 5G, a code rate can be defined as the ratio of the data rate that is allocated for a subframe and the maximum data rate that ideally can be allocated in the subframe, or as the ratio between the transport block size and the total number of physical layer bits per subframe that are available for transmission of that transport block. A lower code rate means that more redundancy bits are inserted during the channel coding process and a higher code rate means that less redundancy bits are inserted.

SUMMARY

The influence of different scenarios of defected Tx chains on the received throughput is described. The throughput represents the average amount of data bits that were successfully transferred to all the UEs per second.

Defected (e.g., having a defect or defective) Tx chains at the antenna array may lead to significant degradation in the performance. Knowledge of the defected Tx chains improves the performance by adapting the precoding matrix. Again, the improvement depends on the number of defected Tx chains and their layout. Additionally, nonoptimal solution for per antenna power constraint yields degraded performance that also need to be considered.

In one embodiment, a method of providing defected transmit chain mitigation includes in a system having a Multiple Input Multiple Output (MIMO) antenna system, determining a number of defected transmit chains within a group of transmit chains; computing a pre-coding matrix taking into account the defected transmit chains; and transmitting signals using the MIMO in accordance with the pre-coding matrix.

DETAILED DESCRIPTION

In the case that several transmitting elements (e.g., a Tx chain) are simultaneously impaired, at least two different layouts are possible: the defected Tx chains are randomly scattered around the array; or, the defected Tx chains are aligned vertically on a random column (for 12 and 24 defected Tx chains—1 and 2 such columns are randomly chosen, respectively). It can be seen that the throughput is worse when the defected Tx chains are aligned in a column rather than randomly scattered, unless the defective Tx chains are known, in which case it is the opposite. This is because disabling an entire column has the most significant effect on the spatial null steering. When defected Tx chains are known the performance of all layouts are almost the same, though column yields slightly better results due to the antenna subarrays (2 vertical antennas have the same feed, therefore we lose less degrees of freedom).

The present application contemplates the use of a processing system to determine, where possible, the set of defected Tx antennas, either by sampling the antenna array directly or indirectly, or by performing computational simulation or analysis on the observed channel, in some embodiments using previously simulated data or characterized data.

Defected Tx chains simulations were made with the following parameters:

General parameters that can be understood throughout as exemplary, unless otherwise indicated, are: subcarrier spacing (SCS)=15 KHz; Genie (e.g., ideal) channel estimation; Channel model parameters: Urban Macro non-line of sight (NLOS)/line of sight (LOS) 38.901; Delay spread: ?DS=0.39, μDS=−6.39 (~0.4 μsec). However, these parameters are not intended to be limiting and the present application applies to other sets of channel parameters.

All users are at 1.5 m height, gNB is at 25 m height. UEs minimum azimuth separation—10.5 degrees; and static simulation—no mobility.

Each channel runs over 1 Frame (10 msec). Modulation—256QAM. Code rate 754/1024. Number of subcarriers 600. Number of horizontal antenna elements—8. Number of Vertical antenna elements—12. Sub array size—2. Number of UEs—8 (assuming single antenna UE's). Number of tested channels instances—54. Floating point simulation. RZF precoding—done for all UEs simultaneously per SC (precoding matrix size-(num of UEs)×(num of BS antenna elements)). Running without impairments model (only Channel+AWGN). HARQ process disabled. Each SNR point holds statistics (sum throughput of all users) averaged over 54 channel instances. DMRS allocation—2 symbols per slot. 256QAM was selected because it is expected to yield the highest impact on performance.

Figure 1:
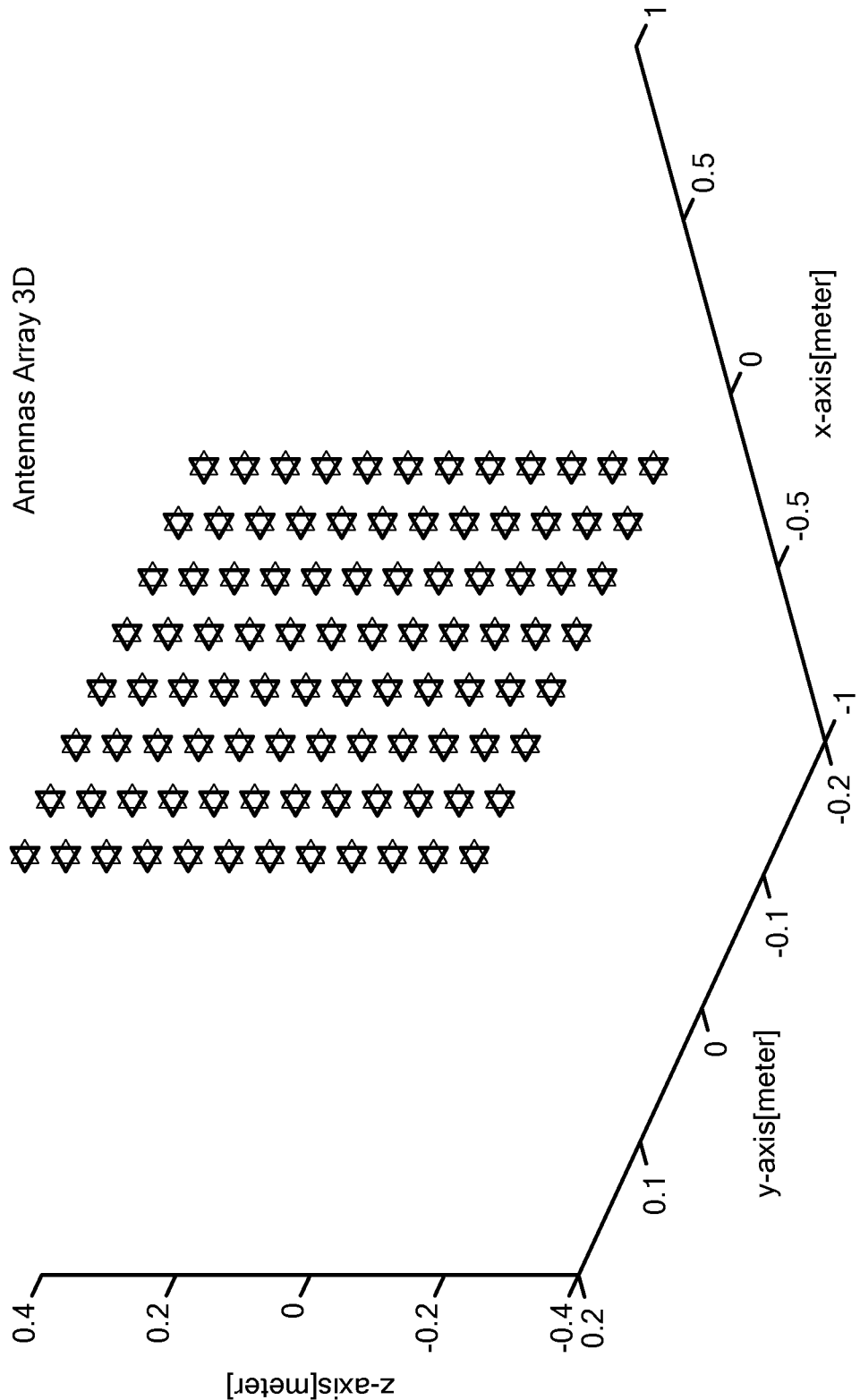
FIG. 1 and FIG. 2 plots the 3D an 2D layout of the antenna array respectively.
Figure 2:
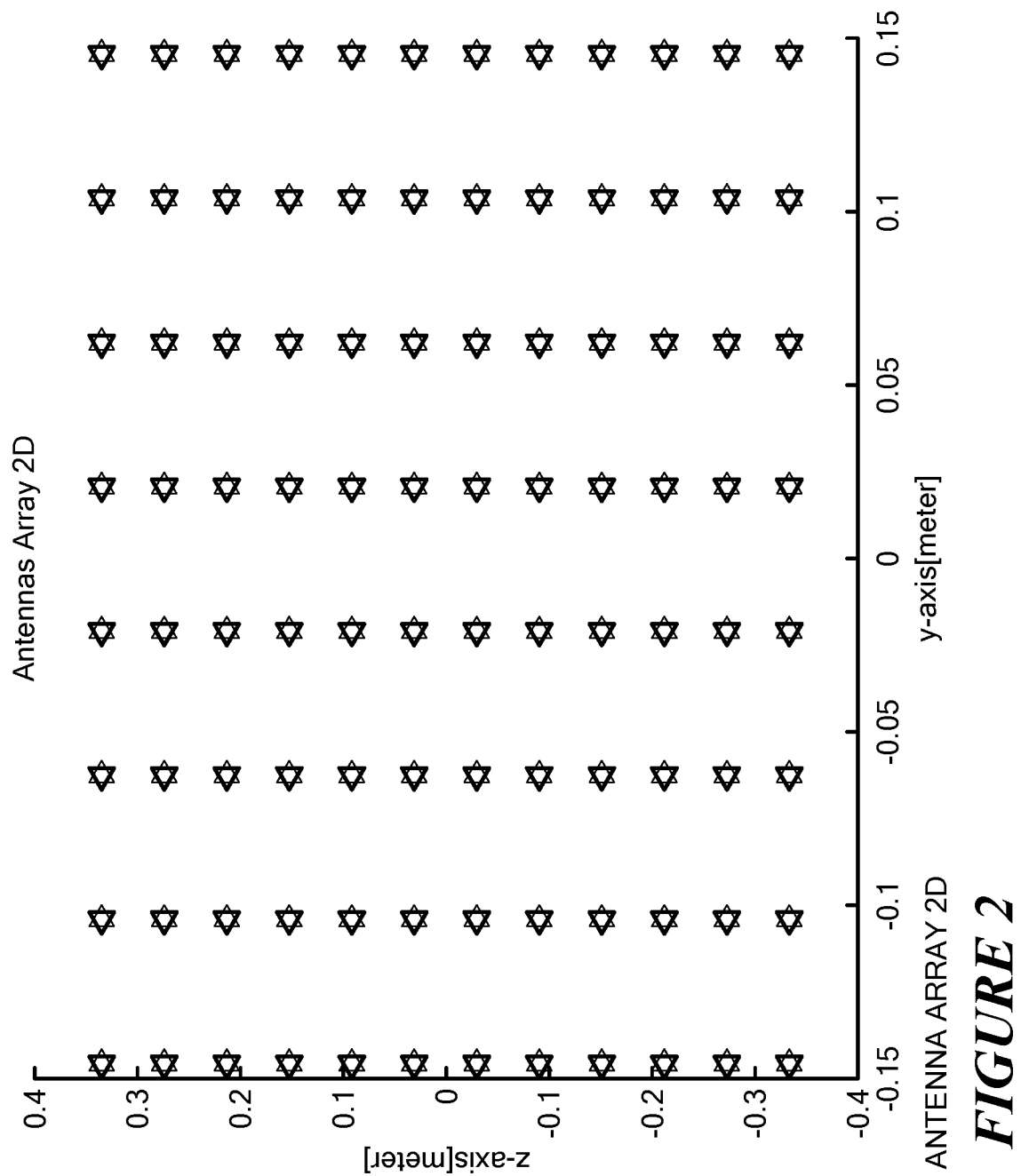

FIG. 1 and FIG. 2 plots the 3D and 2D layout of an exemplary antenna array respectively. At each element location a red and blue triangle corresponds to each element polarization.

Figure 3:
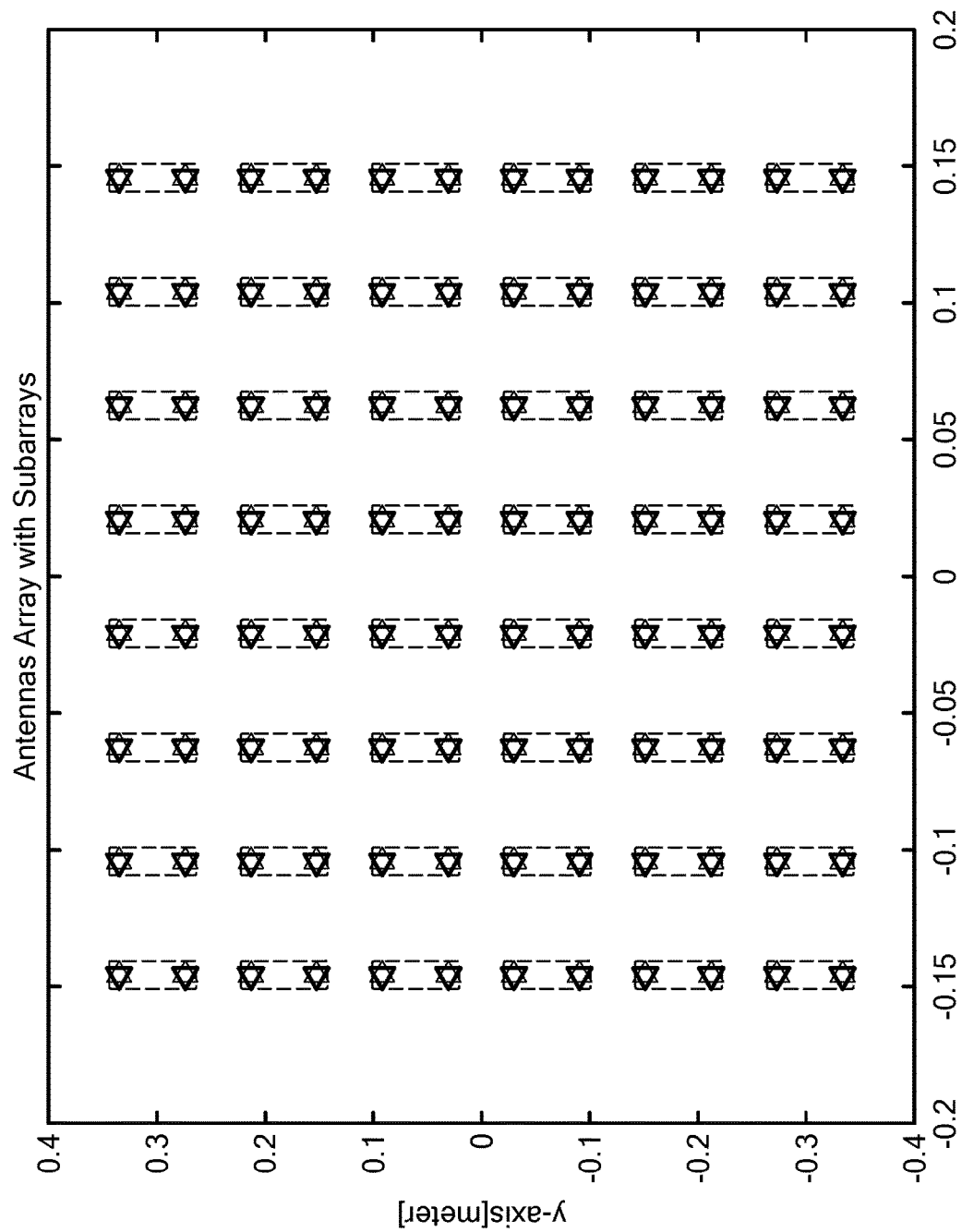
FIG. 3 plots antennas subarrays, in accordance with some embodiments.

FIG. 3 plots additionally plots antennas subarrays. Each green rectangle indicates a different subarray in which 2 elements have the same feed. Different polarizations have different subarrays.

Figure 4:
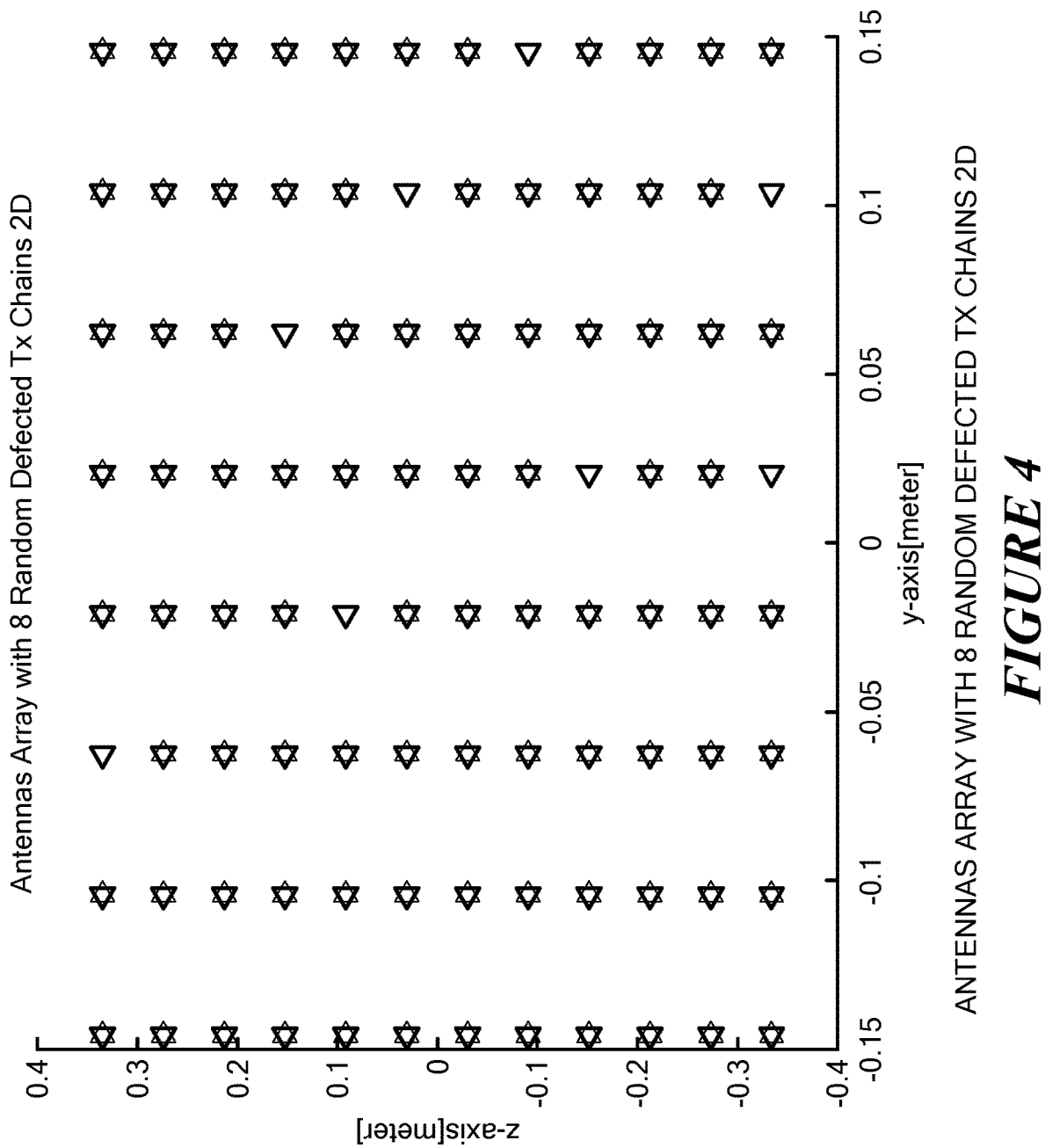
FIG. 4 plots a 2D layout of the antennas array with a random set of defected Tx chains, in accordance with some embodiments.

The following figures plot 2D layout of the antennas array with defected Tx chains. On FIG. 4, 8 random Tx chains are defected, these chains are depicted with only a blue triangle indicating only one (of the two possible) polarization.

Figure 5:
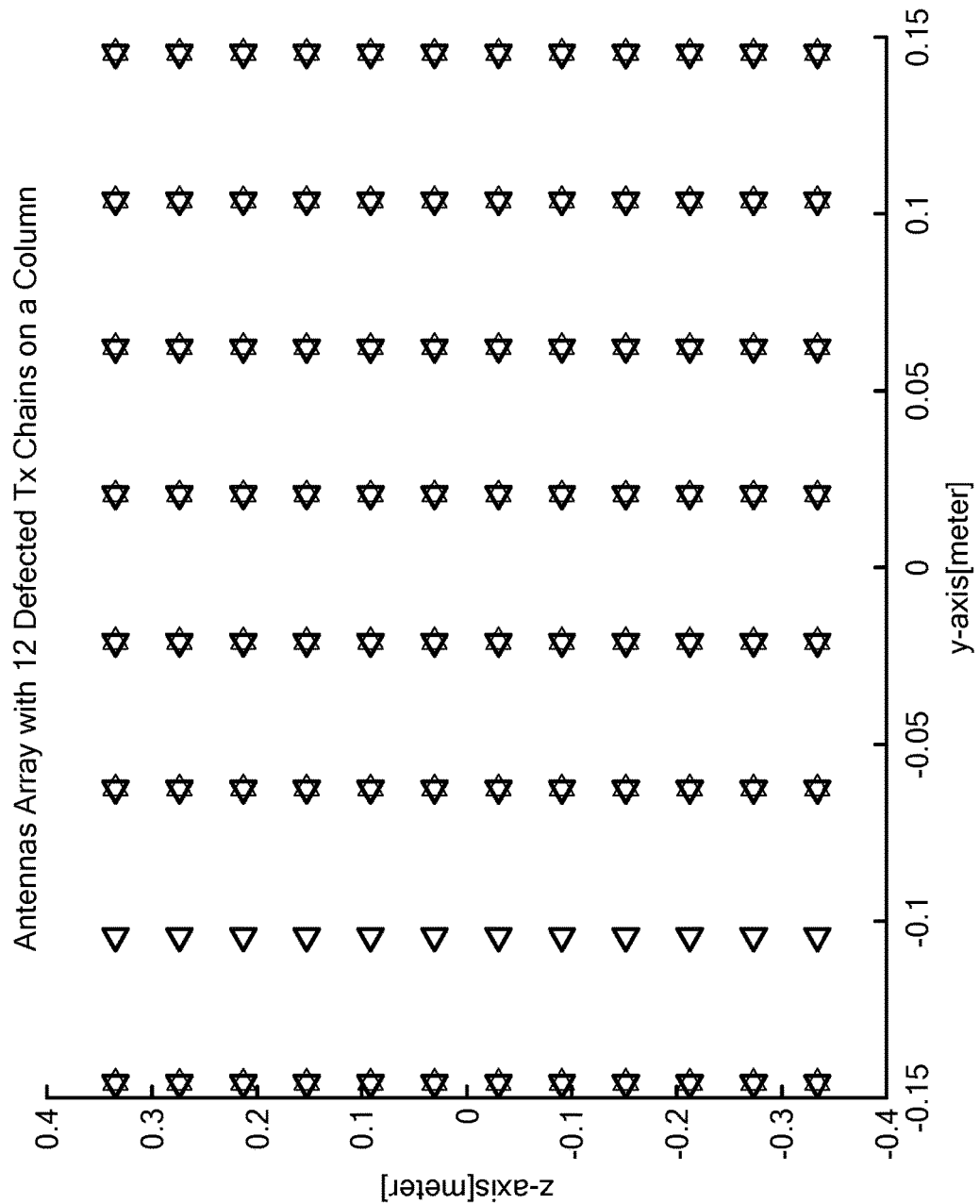
FIG. 5 and FIG. 6 plots the antennas array with full defected column and row respectively.
Figure 6:
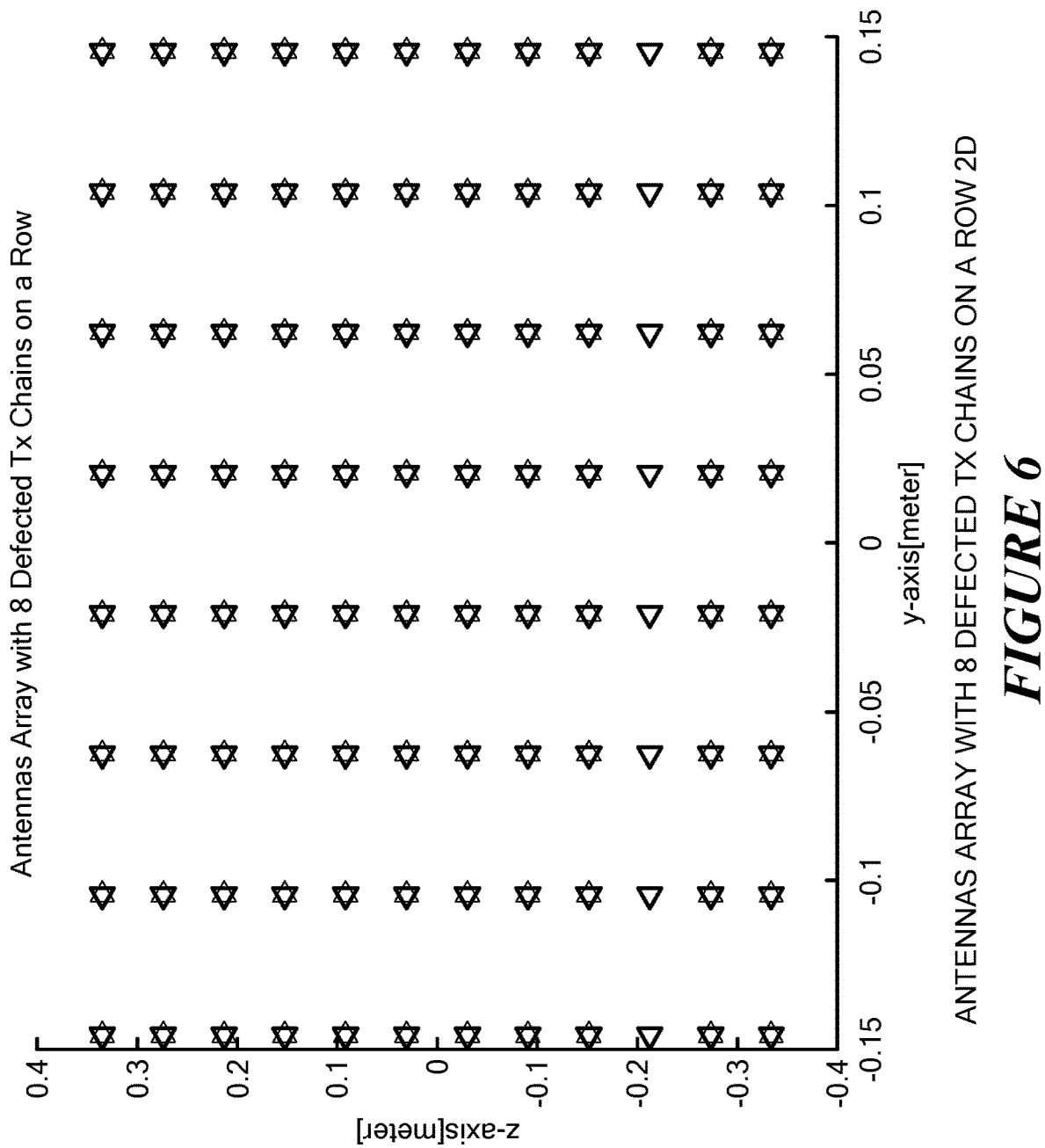
Figure 7:
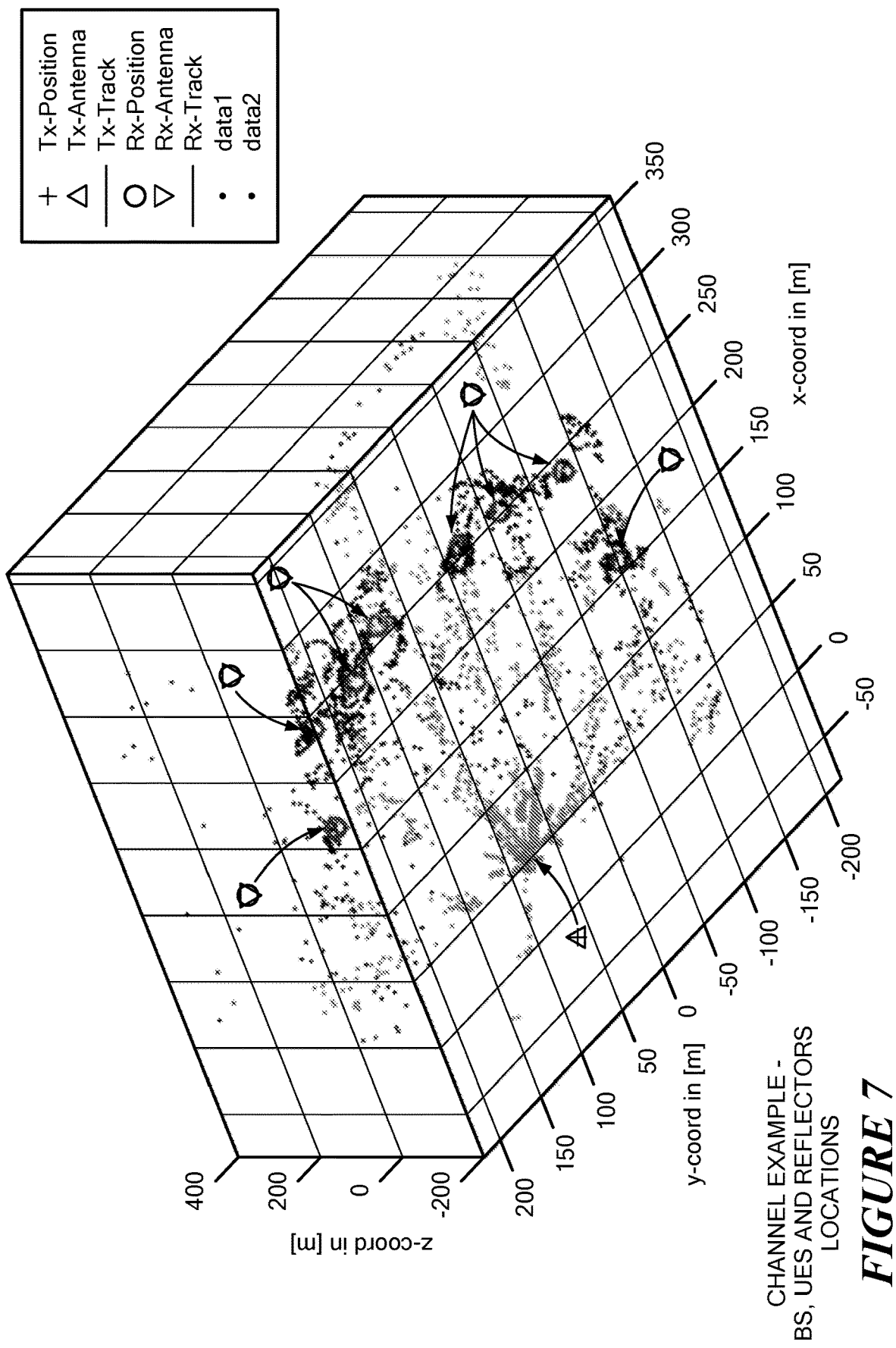
FIG. 7 shows a channel example, with examples of base station, UE, and reflector locations, in accordance with some embodiments.
Figure 8:
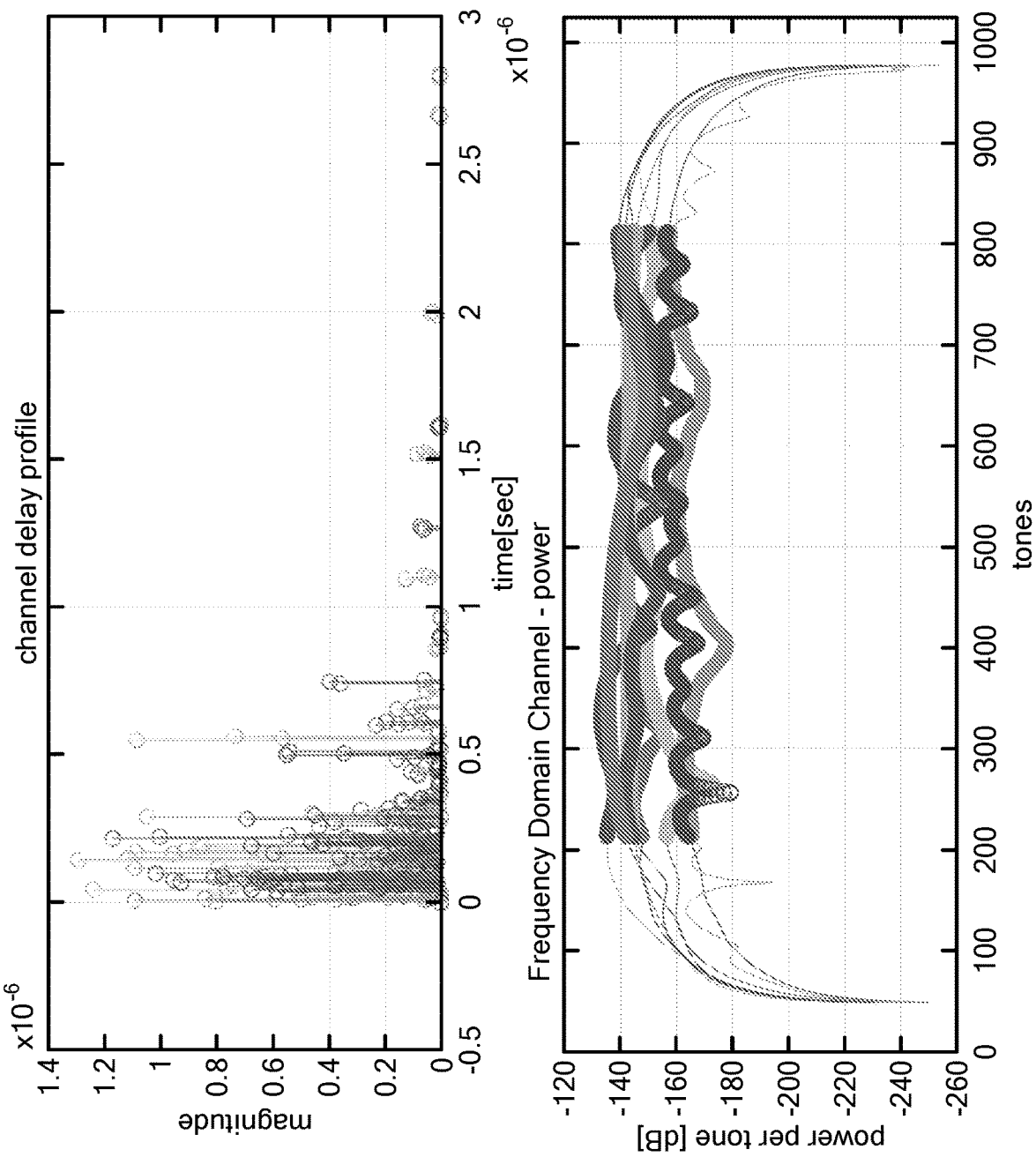
FIG. 8 shows channel coefficients for the channel example in FIG. 7

FIG. 5 and FIG. 6 plots the antennas array with full defected column and row respectively.

Channel Example

Two different scenarios were simulated. In the first one, the defected Tx chains were unknown to the transmitter, hence, relevant entries at the txWaveForm were zeroed out—simulating none transmitting elements. In the second one, the defected Tx chains were known to the transmitter, hence, also relevant entries at the channel estimation matrix were zeroed out—so calculating the precoding matrix takes that into account.

Variable number of defected Tx chains were simulated—1, 2, 4, 8, 12 and 24. Additionally, two different layouts were simulated: defected Tx chains are randomly scattered around the array; and defected Tx chains are aligned vertically on a random column (for 12 and 24 defected Tx chains—1 and 2 such columns are randomly chosen, respectively). 12 and 24 defected Tx chains were simulated only for the scenario in which the defected Tx chains are known, having too great degradation for the unknown scenario.

This section concludes the throughput results for all the simulated scenarios.

Figure 9:
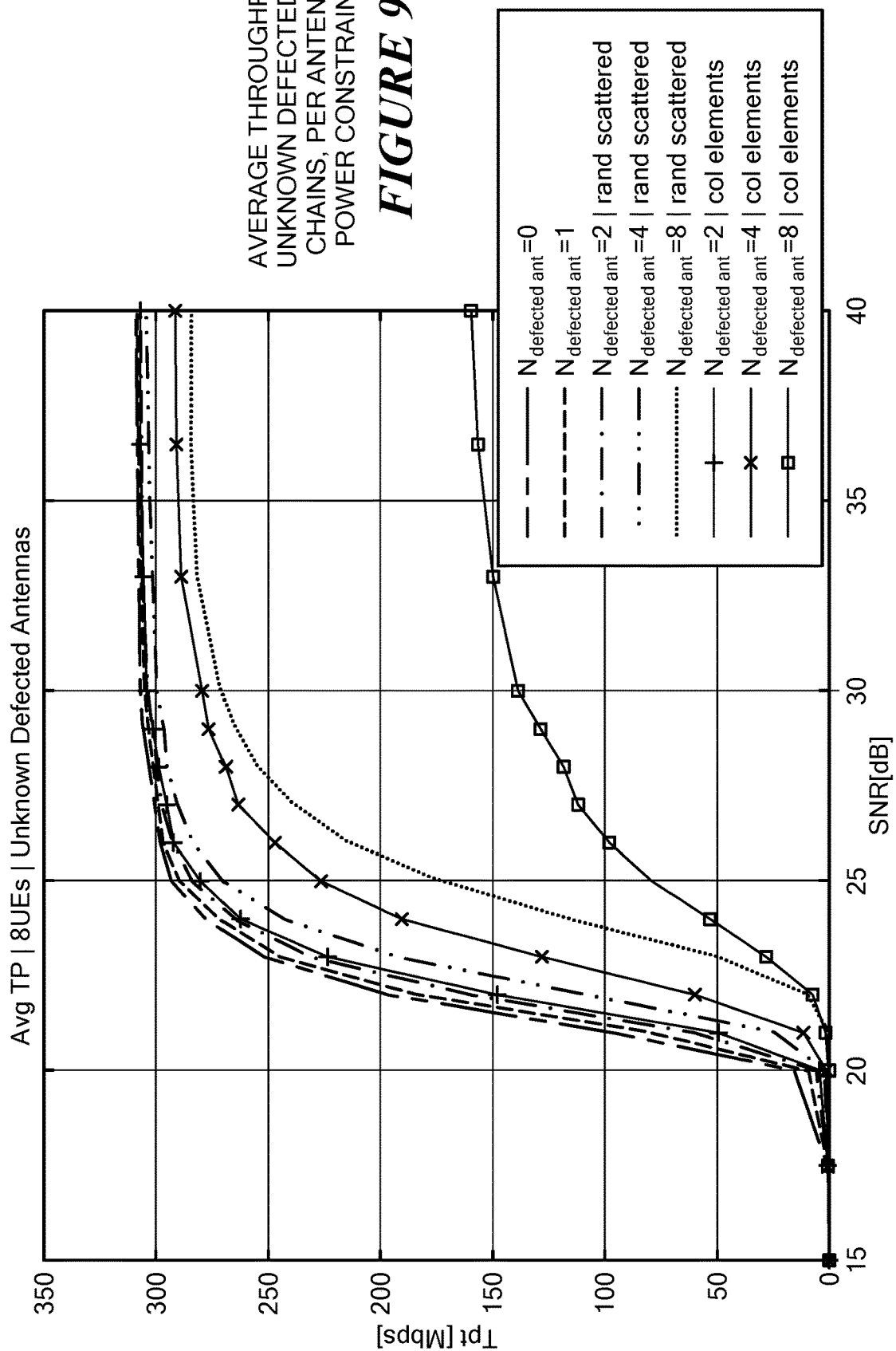
FIG. 9 plots the average throughput (over all channels and UEs) in the case that the defected Tx chains are unknown.

FIG. 9, plots the average throughput (over all channels and UEs) in the case that the defected Tx chains are unknown. It can be seen that the throughput is worse when the defected Tx chains are aligned in a column rather than randomly scattered.

TABLE 1

| Throughput degradation when defected Tx chains are unknown: | | | | | | |
|---|---|---|---|---|---|---|
| | 2 defected Tx chains | | 4 defected Tx chains | | 8 defected Tx chains | |
| | random | column | random | column | random | column |
| SNR Degradation | ~0.4 dB | ~0.5 dB | ~1 dB | ~1.8 dB | ~3 dB | large degradation |
| Max Throughput Degradation | 0% | 0% | ~1.5% | ~5.5% | ~7% | ~48% |

An exemplary embodiment of an antenna subarray as understood by the inventors and embodying various technical elements of the present disclosure, including any necessary technical elements, is found in U.S. Provisional Pat. App. No. 63/477,142, hereby incorporated by reference for all purposes.

Figure 10:
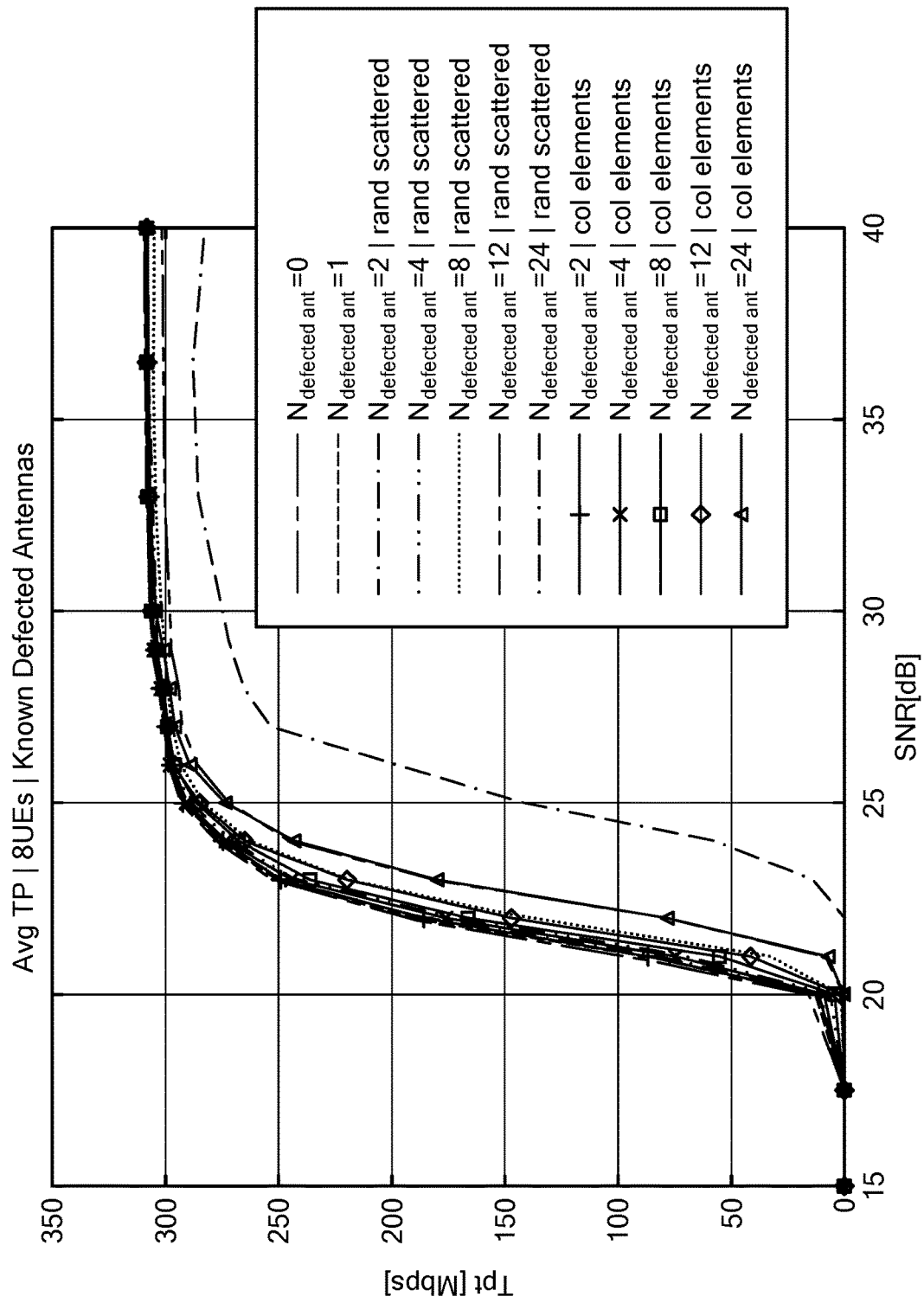
FIG. 10 plots the average throughput (over all channels and UEs) in the case that the defected Tx chains are known.

FIG. 10 plots the average throughput (over all channels and UEs) in the case that the defected Tx chains are known. Due to better performance than unknown defected Tx chains scenario, here, also 12 and 24 defected Tx chains were simulated. It can be seen that the throughput is better when the defected Tx chains are aligned in a column rather than randomly scattered (contrary to the unknown scenario).

TABLE 2

Throughput degradation when defected Tx chains are known:

| | 8 defected Tx chains | | 12 defected Tx chains | | 24 defected Tx chains | |
|---|---|---|---|---|---|---|
| | random | column | random | column | random | column |
| SNR Degradation | ~0.6 dB | ~0.3 dB | ~1.1 dB | ~0.5 dB | ~3.5 dB | ~1.2 dB |
| Max Throughput Degradation | 1.3% | 0% | ~2.6% | 0% | ~7.5% | 0% |

Figure 11:
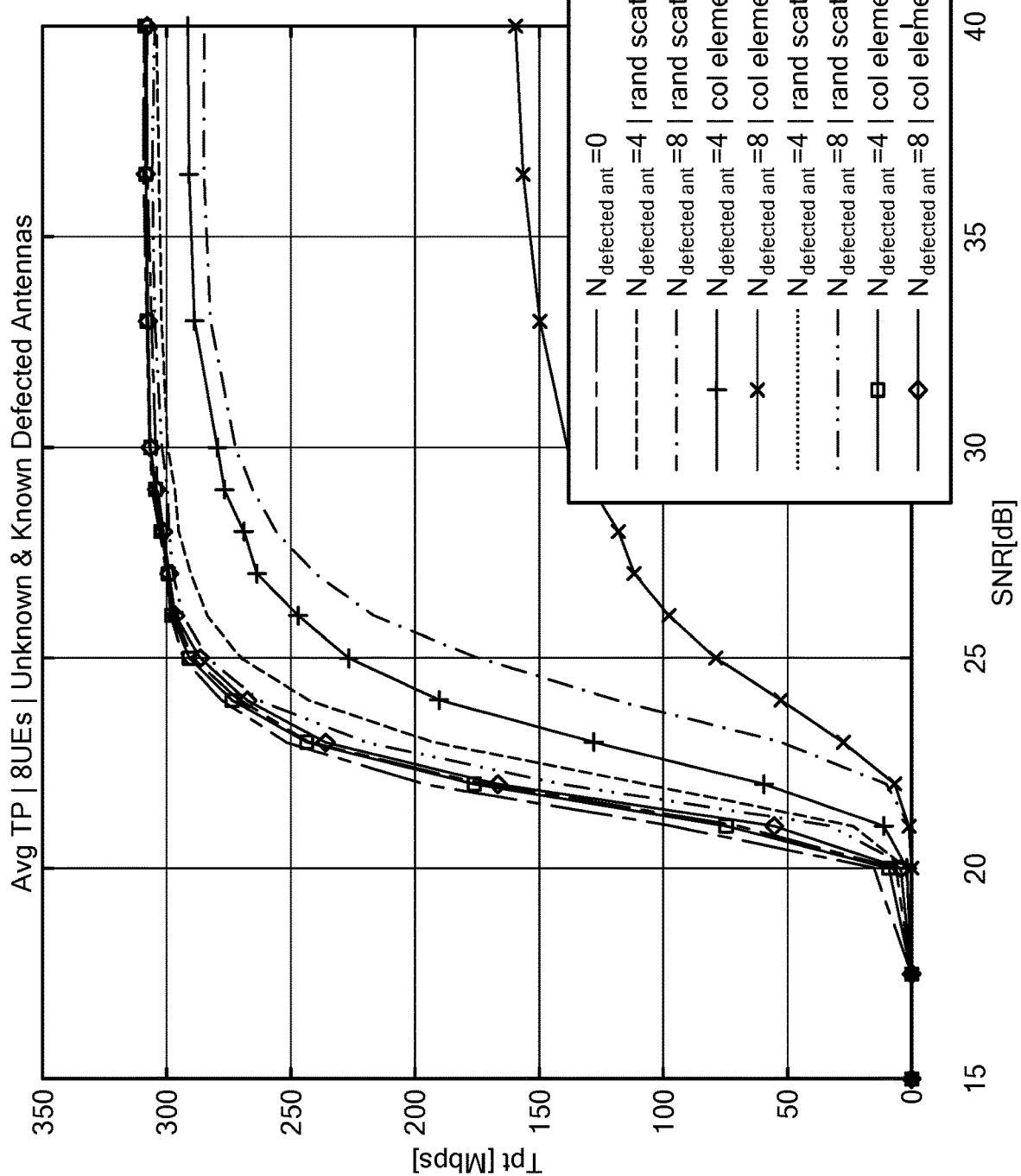
FIG. 11 plots average throughput for unknown and known defected TX chains, in accordance with some embodiments.
Figure 12:
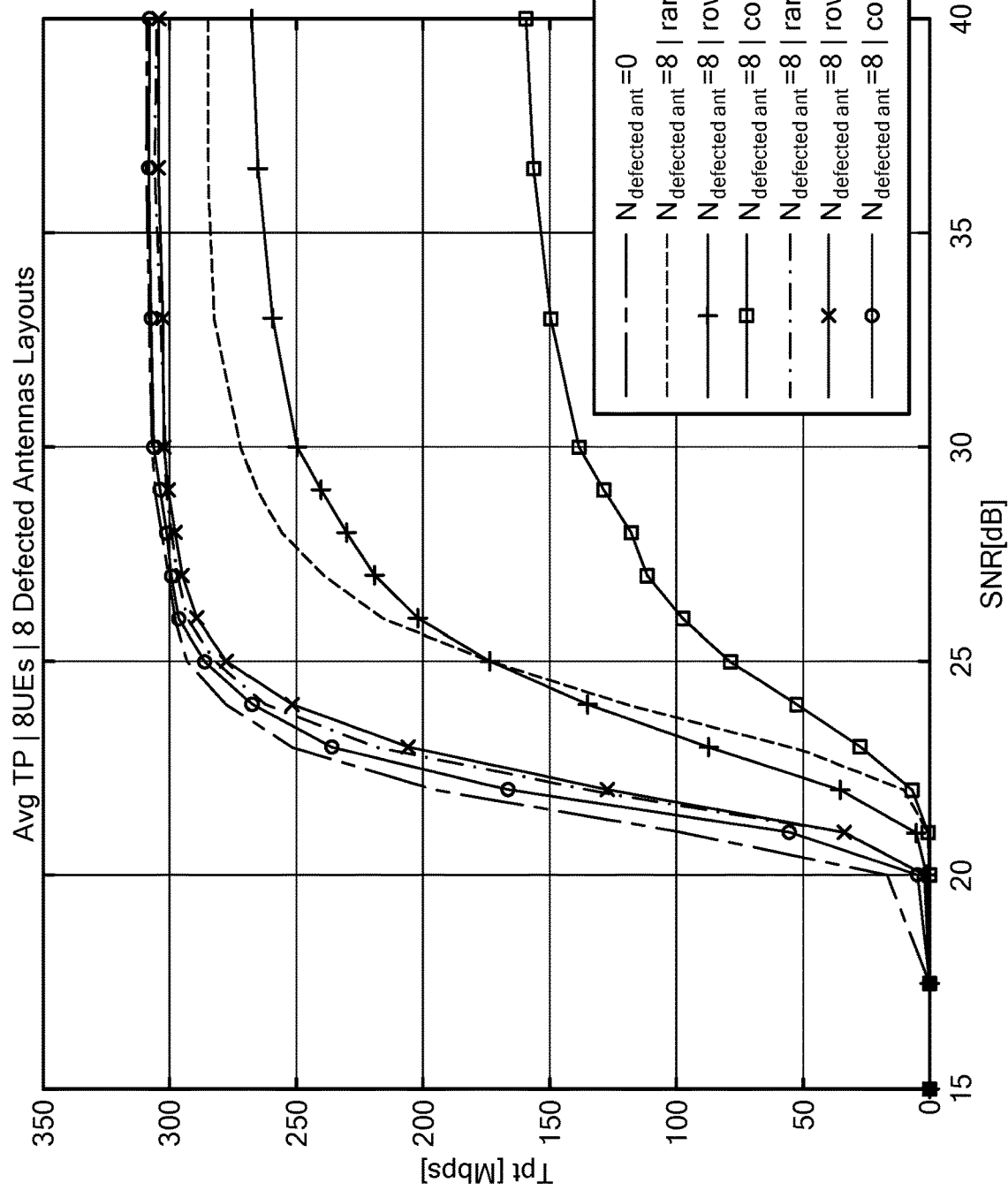
FIG. 12 plots average throughput for various different layouts of known defected TX chains, in accordance with some embodiments.

A comparison of the performance between known and unknown defected Tx chains is depicted in FIG. 11, for the case of 4 and 8 defected Tx chains.

TABLE 3

Throughput improvements (for known defected antennas):

| | 4 defected Tx chains | | 8 defected Tx chains | |
|---|---|---|---|---|
| | random | column | random | column |
| SNR Improvement | ~0.7 dB | ~1.7 dB | ~2.5 dB | large degradation |
| Max Throughput Improvement | 1.6% | 6% | ~6% | 94% |

We can see that defected Tx chains knowledge improves the performance for each scenario. Again, when the defected Tx chains are aligned in a column, knowledge of the defected Tx chains yield better results than any other scenario.

TABLE 4

Throughput degradation (relative to no defected Tx chain):

| | Unknown | | | Known | | |
|---|---|---|---|---|---|---|
| | random | column | row | random | column | row |
| SNR Degradation | ~3 dB | large degradation | ~3 dB | ~0.6 dB | ~0.3 dB | 0.6 dB |
| Max Throughput Degradation | ~7% | ~48% | 13% | 1.3% | 0% | 1.3% |

When defected Tx chains are unknown a column of defected Tx chains results in the worst throughput, that's because disabling entire column has the most significant effect on the spatial null steering. When defected Tx chains are known the performance of all layouts are almost the same, though column yields slightly better results due to the antenna subarrays (2 vertical antennas have the same feed, therefore we lose less degrees of freedom).

Figure 13:
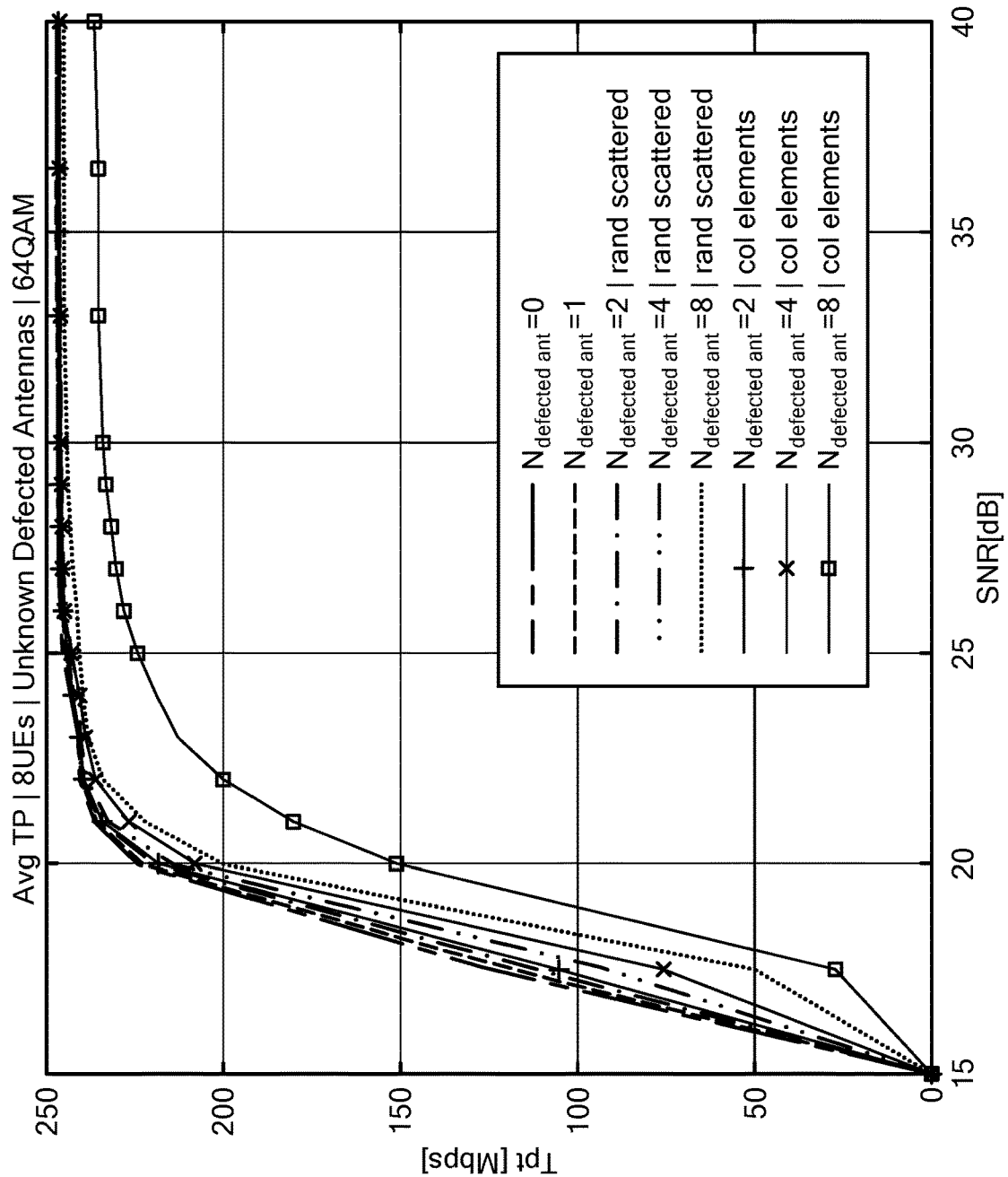
FIG. 13 plots average throughput for unknown defected TX chains per antenna power constraint with a modulation of 64QAM, in accordance with some embodiments.

FIG. 13, plots the average throughput when defected Tx chains are unknown with lower modulation (64QAM). It can be seen that, as expected the effect of defected Tx chain is decrease with lower modulation. i.e. less SNR degradation of any number of defected Tx chains.

TABLE 5

Throughput degradation when defected Tx chains are unknown (64QAM):

| | 2 defected Tx chains | | 4 defected Tx chains | | 8 defected Tx chains | |
|---|---|---|---|---|---|---|
| | random | column | random | column | random | column |
| SNR Degradation | ~0.3 dB | ~0.4 dB | ~0.6 dB | ~0.9 dB | ~1.2 dB | ~2 dB |
| Max Throughput Degradation | 0% | 0% | ~0% | ~0% | ~0% | ~5% |

All the results above were extracted with per antenna power constraint, in which each antenna average power is limited to 400 mW. There's no analytical solution for computing a precoding matrix with this constraint, therefore the current method is to compute the precoding matrix with the total power constraint (over all antennas), which is the known RZF precoder, and then to normalize the power of all antennas such that the antenna with max power is set to 400 mW. Of course, this method is not optimal as it introduces SNR degradation while maintaining the interference mitigation. In this section there's a comparison between the performance of Per Antenna Power Constraint (noted as PAPC) to a Total Power Constraint (noted as TPC), in which the total transmitted power is limited.

Figure 14:
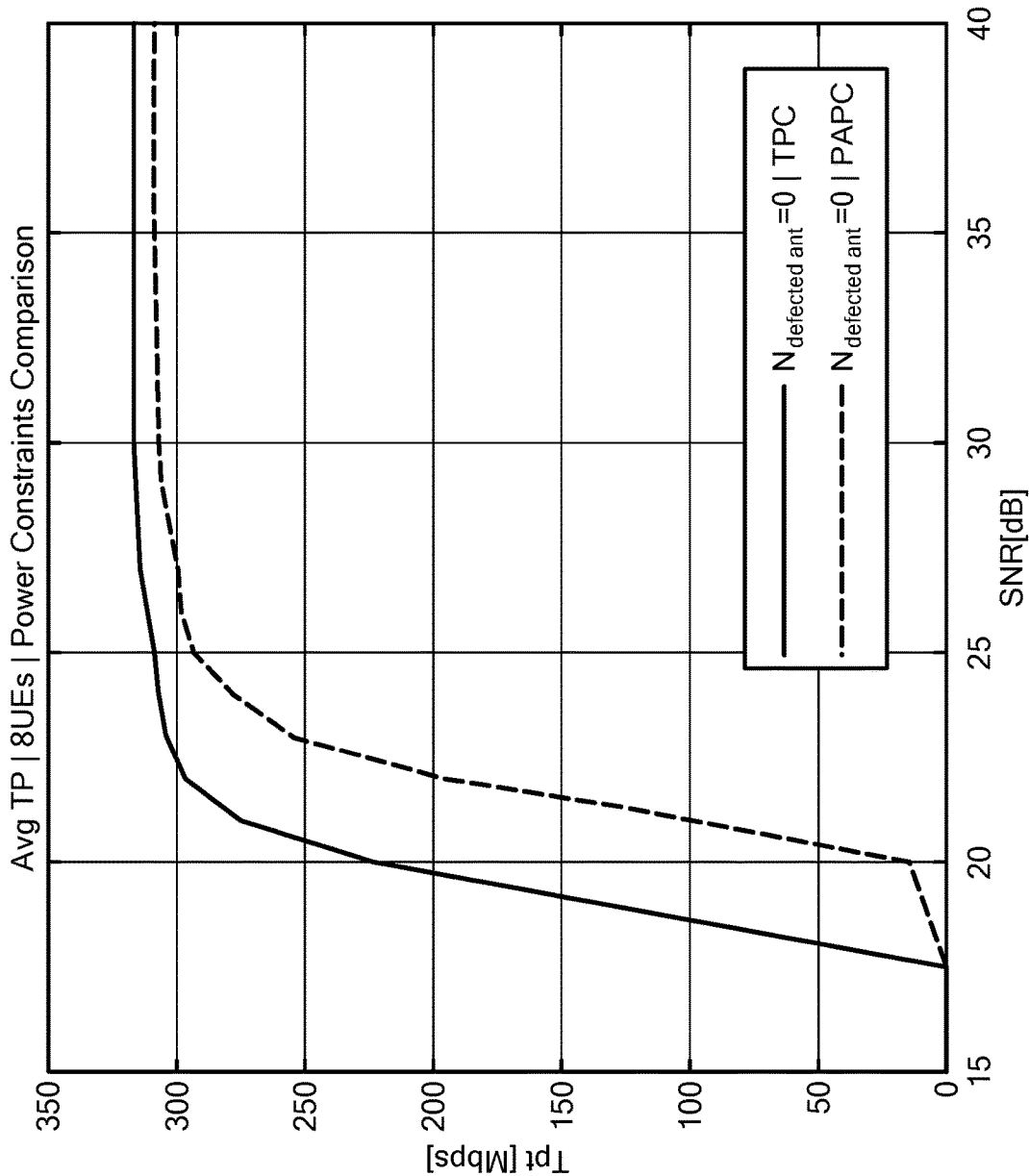
FIG. 14 plots an average throughput power constraint comparison, in accordance with some embodiments.

FIG. 14, plots the average throughput with TPC and PAPC (with no defected Tx chains). It can be seen that the performance with PAPC worse than the performance with TPC.

Throughput degradation with no defected Tx chains:
SNR degradation—~2.5 dB

Max throughput degradation stems from minor differences of the window applied on each symbol between two simulation runs.

In some embodiments, impairments to runs are simulated and the signatures of such simulations are stored for later retrieval and use with a channel estimation processor: Channel estimation errors; Precoding Frequency resolution; and Phase noise.

Figure 15:
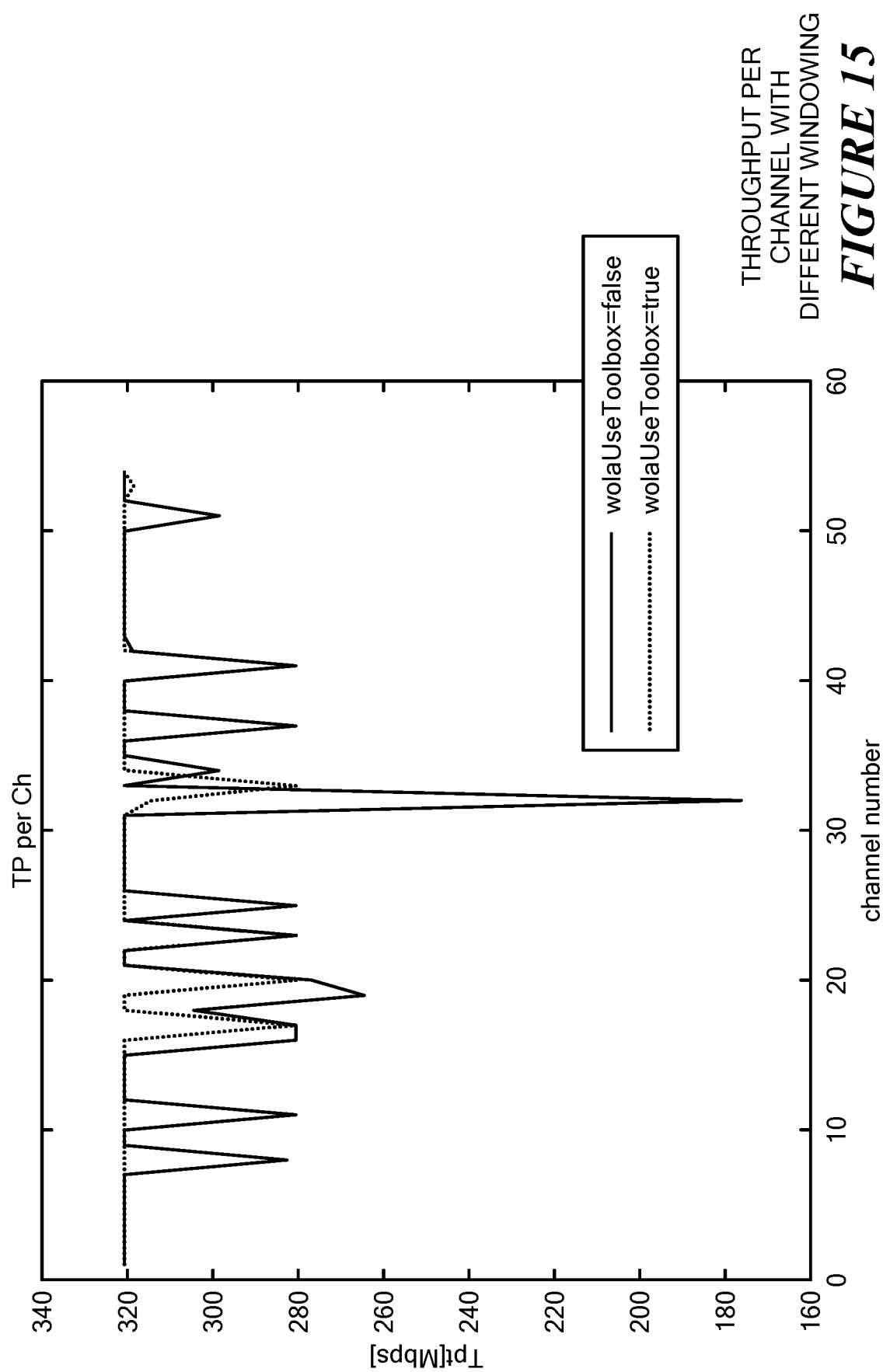
FIG. 15 plots an average throughput with different windowing, in accordance with some embodiments.
Figure 16:
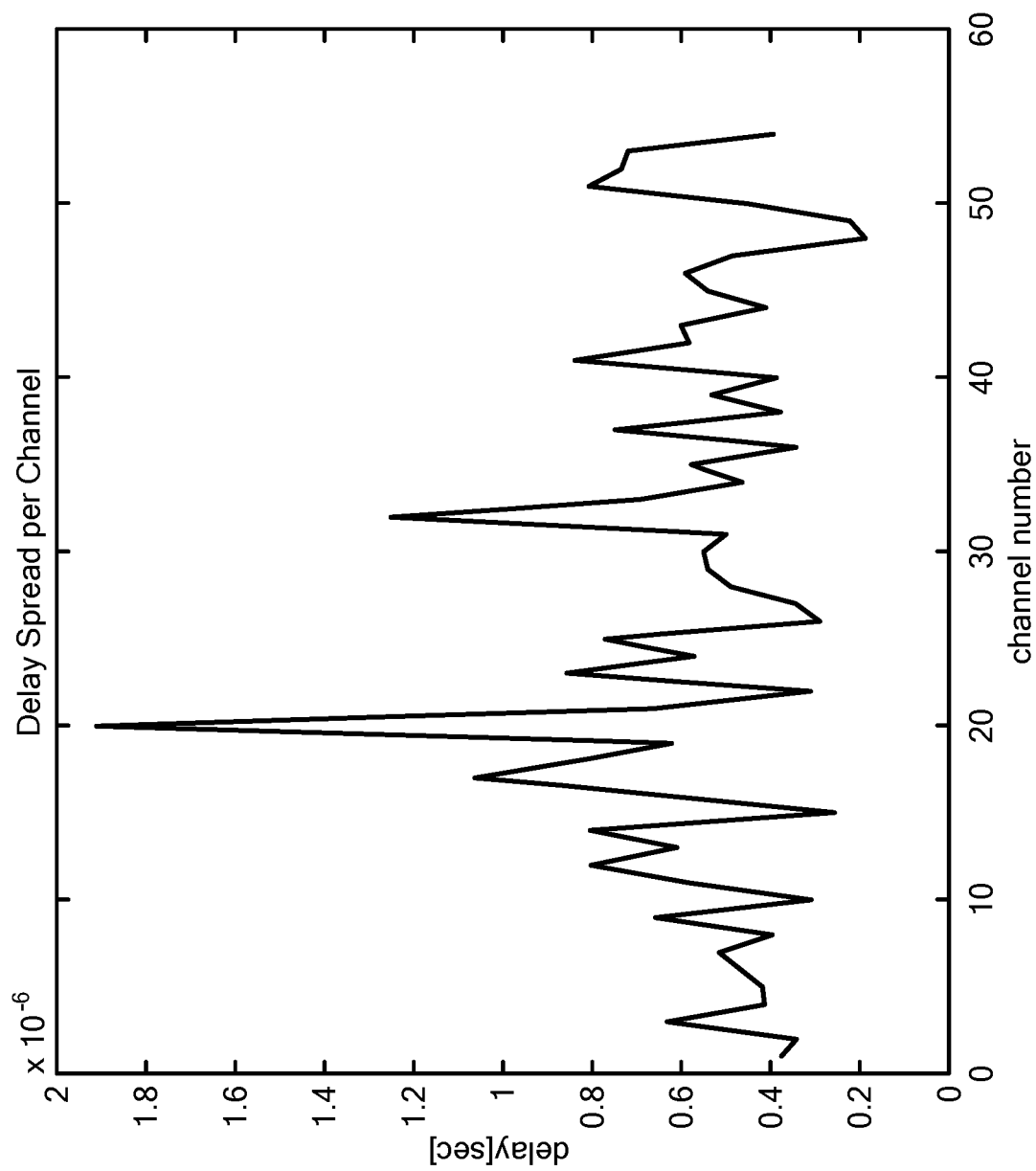
FIG. 16 plots a delay spread, in accordance with some embodiments.
Figure 17:
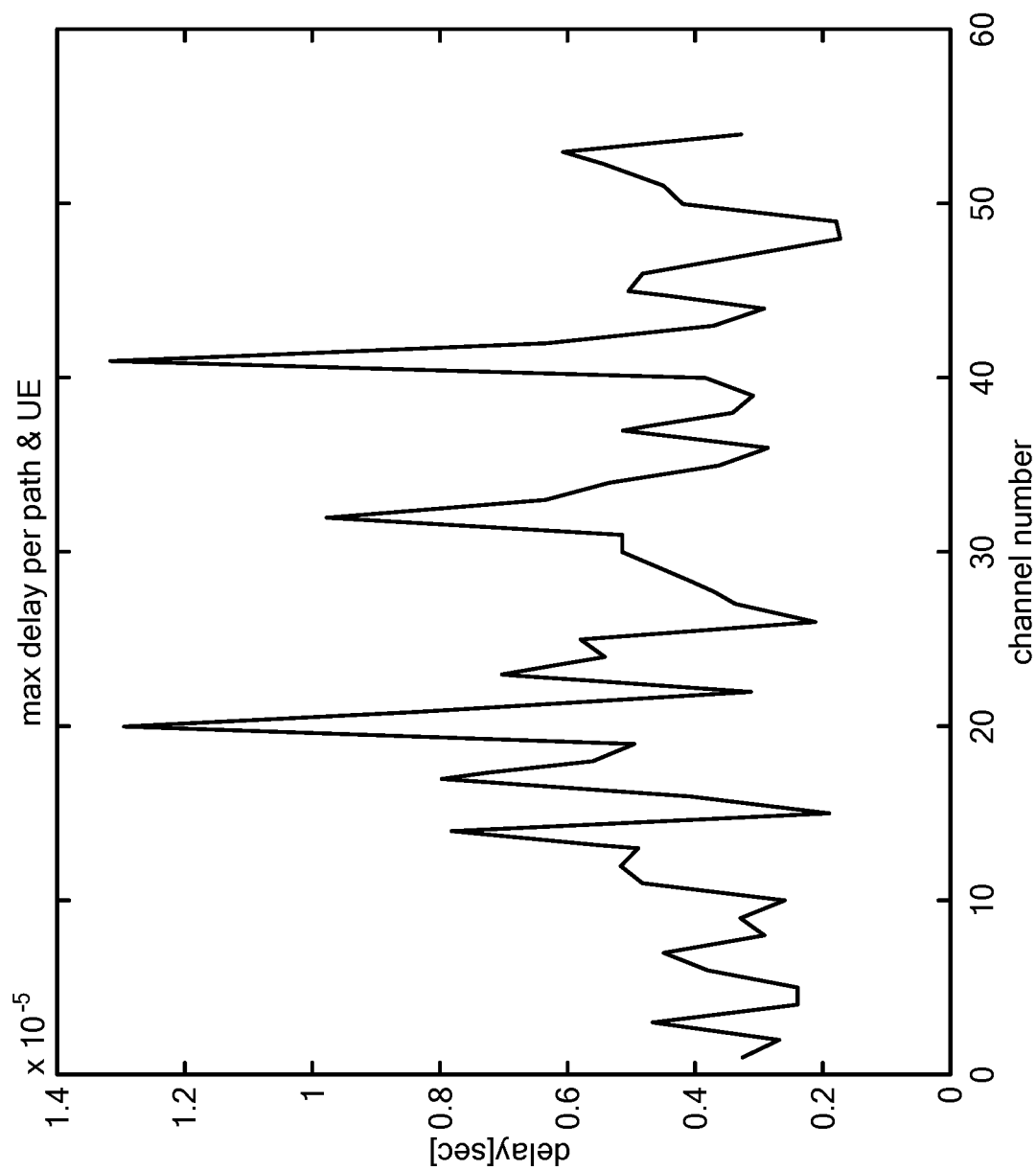
FIG. 17 plots a max delay, in accordance with some embodiments.

Max throughput degradation at FIG. 14 stems from the fact that TPC ran with wolaUseToolbox=false and PAPC with wolaUseToolbox=false which effect the window that's applied on the symbols. FIG. 15 plots the throughput per channel of these two configurations. The throughput is affected mainly for channels with larger max delay (or delay spread). Delay spread and max are plotted at FIG. 16 and FIG. 17 respectively.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method of providing defective transmit chain mitigation, comprising:
   determining, in a telecommunications system having a Multiple Input Multiple Output (MIMO) antenna system, a set of defective transmit chains within a group of transmit chains;
   retrieving, from a storage medium, stored characteristics of defective transmission elements;
   computing a pre-coding matrix taking into account the defective transmit chains; and
   transmitting signals using the MIMO antenna system in accordance with the computed pre-coding matrix.

2. The method of claim 1, wherein the telecommunications system is a 5G system.

3. The method of claim 1, further comprising determining the set of defective transmit chains by sampling an antenna array of the MIMO antenna system.

4. The method of claim 1, further comprising determining the set of defective transmit chains by indirectly sampling an antenna array of the MIMO antenna system.

5. The method of claim 1, further comprising determining the set of defective transmit chains by observing a channel and performing computational analysis on the observed channel.

6. The method of claim 1, further comprising determining the set of defective transmit chains by observing a channel and performing computational analysis on the observed channel using stored simulation signatures.

7. The method of claim 1, further comprising determining the set of defective transmit chains by observing a channel and comparing a channel estimation error of the observed channel with a simulated stored channel estimation error.

8. The method of claim 1, further comprising determining the set of defective transmit chains by observing a channel and comparing a precoding frequency resolution of the observed channel with a simulated stored precoding frequency resolution.

9. The method of claim 1, further comprising determining the set of defective transmit chains by observing a channel and comparing a phase noise of the observed channel with a simulated stored phase noise.

10. The method of claim 1, further comprising determining whether a set of defective transmit chains are aligned in a single column of transmission elements.

11. The method of claim 1, further comprising retrieving, from a storage medium, stored characteristics of defective transmission elements based on simulations.

12. A non-transitory computer-readable medium containing instructions which, when executed at a processor on a telecommunications system having an array of transmission elements, performs steps comprising:
    determining, in a telecommunications system having a Multiple Input Multiple Output (MIMO) antenna system, a set of defective transmit chains within a group of transmit chains;
    retrieving, from a storage medium, stored characteristics of defective transmission elements;
    computing a pre-coding matrix taking into account the defective transmit chains; and
    transmitting signals using the MIMO antenna system in accordance with the computed pre-coding matrix.

13. The method of claim 12, the steps further comprising determining the set of defective transmit chains by indirectly sampling the antenna array.

14. The method of claim 12, the steps further comprising determining the set of defective transmit chains by observing a channel and performing computational analysis on the observed channel.

15. The method of claim 12, the steps further comprising determining the set of defective transmit chains by observing a channel and performing computational analysis on the observed channel using stored simulation signatures.

16. The method of claim 12, the steps further comprising determining the set of defective transmit chains by observing a channel and comparing a channel estimation error of the observed channel with a simulated stored channel estimation error.

17. The method of claim 12, the steps further comprising determining the set of defective transmit chains by observing a channel and comparing a precoding frequency resolution of the observed channel with a simulated stored precoding frequency resolution.

18. The method of claim 12, the steps further comprising determining the set of defective transmit chains by observing a channel and comparing a phase noise of the observed channel with a simulated stored phase noise.

19. The method of claim 12, the steps further comprising determining whether the set of defective transmit chains are aligned in a single column of transmission elements.

20. The method of claim 12, the steps further comprising retrieving, from a storage medium, stored characteristics of defective transmission elements based on simulations.

* * * * *